United States Patent [19]

Palmer et al.

[11] 4,398,794
[45] Aug. 16, 1983

[54] DUAL DIRECTIONAL TAP COUPLER

[75] Inventors: John P. Palmer, Pomona; Phillip B. Ward, Jr., Brea, both of Calif.

[73] Assignee: General Dynamics, Pomona Division, Pomona, Calif.

[21] Appl. No.: 322,478

[22] Filed: Nov. 18, 1981

Related U.S. Application Data

[63] Continuation of Ser. No. 123,038, Feb. 20, 1980, abandoned.

[51] Int. Cl.³ .................................................. G02B 5/14
[52] U.S. Cl. ...................................................... 350/96.19
[58] Field of Search ............... 350/96.15, 96.16, 96.17, 350/96.19, 96.20

[56] References Cited

U.S. PATENT DOCUMENTS

| | | | |
|---|---|---|---|
| 3,508,589 | 4/1970 | Derick et al. | 139/420 |
| 3,610,727 | 10/1971 | Ulrich | 350/96 |
| 3,614,198 | 10/1971 | Martin et al. | 350/96 |
| 3,770,339 | 11/1973 | Ramaswamy | 350/160 R |
| 3,777,149 | 12/1973 | Marcatili | 250/209 |
| 3,791,716 | 2/1974 | Borel et al. | 350/160 LC |
| 3,838,908 | 10/1974 | Channin | 350/160 LC |
| 3,901,582 | 8/1975 | Milton | 350/96 |
| 3,905,676 | 9/1975 | Ulrich | 350/96 |
| 3,918,794 | 11/1975 | Milton | 350/96 |
| 3,933,410 | 1/1976 | Milton | 350/96 |
| 3,953,727 | 4/1976 | d'Auria et al. | 250/199 |
| 3,982,123 | 9/1976 | Goell et al. | 250/227 |
| 4,021,097 | 5/1977 | McMahon | 350/96 |
| 4,089,584 | 5/1978 | Polczynski | 350/96.16 |
| 4,103,154 | 7/1978 | d'Auria et al. | 250/227 |
| 4,125,768 | 11/1978 | Jackson et al. | 350/96.19 X |
| 4,152,045 | 5/1979 | Hammer | 350/96.19 |

FOREIGN PATENT DOCUMENTS

| | | | |
|---|---|---|---|
| 52-24539 | 2/1977 | Japan | 350/96.15 |
| 54-118255 | 9/1979 | Japan | 350/96.15 |

OTHER PUBLICATIONS

Cooper, "Coupler for Optical Data," IBM Technical Disclosure Bulletin, 16, No. 5, 1470-1471 (Oct. 1973).
Hsu et al., "Single Mode Optical Fiber Pick-Off Coupler," Applied Optics, 15, No. 10, (Oct. 1976).
Karr et al., "Lightwave Fiber Tap," Applied Optics, 17, 2115, (Jul. 15, 1978).
Kuwahara et al., "A Semi-Transparent Mirror-Type Directional Coupler for Optical Fiber Applications," IEEE Transactions on Microwave Theory and Techniques, 23, 179, (Jan. 1975).
Gambling et al., "Radiation From Curved Single-Mode Fibers," Electronics L. 12, 567, (Oct. 14, 1976).

Primary Examiner—John D. Lee
Assistant Examiner—Frank González
Attorney, Agent, or Firm—Henry M. Bissell; Edward B. Johnson

[57] ABSTRACT

A low-loss fiber optic tap coupler including an optical fiber mounted and adhered to a curved surface and having a clad single fiber core, a planar surface extending partially into and along the fiber through the cladding, a prism mounted on the surface having two reflective surfaces positioned to receive signals from the fiber travelling in opposite directions, and photodiodes mounted adjacent the prism to receive the reflected signals.

16 Claims, 8 Drawing Figures

DUAL DIRECTIONAL TAP COUPLER

This is a continuation of application Ser. No. 123,038, filed Feb. 20, 1980, now abandoned.

BACKGROUND OF THE INVENTION

1. Field of the Invention

This invention relates to fiber optic transmission lines and, more particularly, to devices for attachment to optical fibers for monitoring a predetermined portion of the light beam transmitted therein in both directions.

2. Description of the Prior Art

The field of fiber optics has progressed in a relatively few years from laboratory curiosities and decorative pieces to present-day systems of high sophistication for optical communication and data transmission. Optical fibers or light tubes are specially fabricated filaments which exhibit the property of transmitting light longitudinally along a flexible axis. Various materials which can be used in fabrication of optical fibers and the particular properties thereof are described in Derick et al U.S. Pat. No. 3,508,589 and, in further detail, in British Pat. No. 1,037,498, cited therein. Low-loss fiber optic taps are important components for fiber optic data links and data buses. This is true because it is desirable to be able to tap a portion of a signal propagating through an optical fiber without breaking or terminating the fiber, since fiber terminations add unwanted optical losses to the system and unfavorably increase the need for highly precise fiber splicing and interconnecting arrangements. Since fiber optic transmission lines having a large number of signal taps are inherently power-starved, it is important to minimize excess losses associated with these components. Furthermore, it is desirable to have taps which can be fabricated so that the tape ratio (the power output of the tap divided by the power into the fiber in a given direction) can be conveniently tailored to the unique requirements of a given system. Efficient fiber optic taps have been reported previously whereby two fibers are cleaved, or ground and polished, at specific angles and butt joined. For example, see Karr et al., "Lightwave Fiber Tap", *Applied Optics*, Vol. 17, page 2215 (July 15, 1978) and Kuwahara et al., "A Semi-Transparent Mirror-Type Directional Coupler for Optical Fiber Applications," *IEEE Transactions on Microwave Theory and Technique*, Vol. 23, page 179 (January 1975). In these examples, the tap ratio is variable, either by changing the cleavage angle or by using materials with different indices of refraction between the cleaved surfaces. However, devices fabricated by such methods are quite fragile and cannot be easily reproduced with sufficient accuracy.

It has been demonstrated that when an optical fiber is bent in the form of an arc, there is an increased tendency for light to escape from the bent region in a radiation pattern which is primarily in the plane of the bend and which is directed away from the center of curvature. See, for example, Gambling et al., "Radiation From Curved Single-Mode Fibers," *Electronics Letters*, Vol. 12, page 567 (Oct. 14, 1976); and Goell et al. U.S. Pat. No. 3,982,123. The tendency for light to escape from the bent region of the fibers is enhanced when a flat region is lapped and polished into the fiber surface perpendicular to the radius of the bend in the fiber.

Polczynski U.S. Pat. No. 4,089,584 discloses optical taps coupled to a single optical fiber in a straight configuration with one planar side formed along the fiber core. McMahon U.S. Pat. No. 4,021,097 discloses an optical coupling apparatus in which a bundle of side-by-side optical fibers formed in a ribbon are curved, lapped and joined to an adjacent slab of light propagating material having a related refractive index. This slab wave guide is extremely thin (comparable to the thickness of the optical fibers) and therefore is difficult to fabricate and very fragile.

A specific combination of a photodiode sealed to a single optical fiber for supplying electrical signal characteristics of incident optical energy is disclosed in d'Auria et al. U.S. Pat. No.4,103,154.

The use of prisms for coupling light with optical transmission systems is well known as exemplified by U.S. Pat. Nos. 3,610,727 and 3,905,676 of Ulrich; 3,614,198 of Martin et al. and 3,901,582, 3,918,794 and 3,933,410 of Milton. Also, see U.S. Pat. No. 3,838,908 of Channin; Cooper "Coupler for Optical Data" *IBM Technical Disclosure Bulletin*, Vol. 16, No. 5 (October 1973) and Hsu et al. "Single Mode Optical Fiber Pick-Off Coupler"*Applied Optics* Vol. 15, No. 10 (October 1976). Lastly, an optical fiber system utilizing photodiodes, and prisms to separate signals supplied to the photodiodes is shown in U.S. Pat. No. 3,777,149 of Marcatili.

SUMMARY OF THE INVENTION

In brief, the devices of the present invention involve the use of a solid form to support and bend an optical fiber from which a predetermined portion of the incident light is to be tapped. The form is machined from a solid material, such as aluminum, and has one curved side with a radius of curvature of between 5 and 8 cm., preferably about 6 cm. A coating of epoxy resin is placed on the curved surface of the form, after which the fiber is placed in the epoxy and is constrained to the curvature of the form. When the epoxy has been cured and a plurality of forms so prepared, the forms are mounted on a lapping and polishing fixture. The loose fiber portions are secured to the fixture to prevent breakage of the fibers. A flat surface is lapped into the epoxy and eventually a small region of the glass fiber, embedded in the epoxy, becomes exposed. Lapping of the flat surface into the fiber and the epoxy continues until the desired amount of material has been removed. The depth of removal of the fiber core is monitored by measuring the length and width of the flat region on the fiber. This measurement can be made by using a microscope with a micrometer-actuated x-y stage. The depth of the fiber removal is controlled routinely to an accuracy of ±10 micrometers and preferably to an accuracy of ±2 micrometers. The lapped surface is then polished using the same support fixture on a second machine which uses a fine (e.g. ¼ micron) polishing compound. Further details of such a fabrication procedure may be found in application Ser. No. 15,027, filed Feb. 26, 1979 and assigned to the assignee of this application, which application is now abandoned.

The complete device comprising the invention includes a prism for directing the light travelling in a given direction in the fiber to an associated photodiode detector. Two photodiodes are provided in order to sense signals travelling in opposite directions in the fiber. The prism to be assembled on the fiber element has two mirrored surface ends, one for each direction of light travel, and each surface angle is preferably equal to 52° relative to the prism base. The performance of the coupler is strongly dependent on the angle of the reflection from the prism face that directs the light toward the photodiode. The prism should produce an exiting beam which is narrow and highly collimated. For a radius of curvature of 6 cm., the angle may be 52°±5°. With this arrangement, nearly all of the light coupled out of the fiber is transmitted to the active area of the photodiode. This arrangement, of course, is effective for both mirrored prismatic surfaces so that coupling is effective for light travelling in both directions.

The associated photodiodes are either cemented directly to the upper surface of the prism, using an optically transparent epoxy, or supported adjacent the prism so that the light leaving the fiber is directed toward the appropriate photodiode. The photodiode can be packaged in a standard header/lid assembly using a lid with a window in it. More specifically, the photodiodes can be packaged in a hybrid microelectronic assembly whereby a preamplifier is included in the assembly and a window is provided on the packaged lid.

The fiber/prism/photodiode system is preferably mounted rigidly in a suitable package, such as an aluminum box or molded enclosure, which supports a pair of opposed optical connectors and an electrical connector needed to interface with device. In such an embodiment, the radiating light which is tapped from the fiber is highly localized and highly collimated by virtue of the coupling from the flat region of the bent fiber to the photodiode using the described optical prism.

BRIEF DESCRIPTION OF THE DRAWINGS

A better understanding of the present invention may be had from a consideration of the following detailed description, taken in conjunction with the accompanying drawings in which.

DESCRIPTION OF THE PREFERRED EMBODIMENTS

Figure 1:
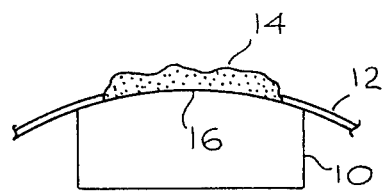
FIG. 1 is a view of a portion of one embodiment of the invention in a preliminary stage of fabrication.
Figure 2:
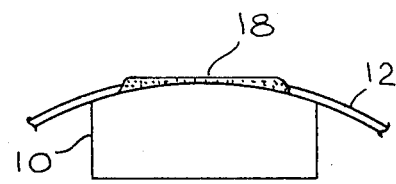
FIG. 2 is a view of the portion of FIG. 1 following a succeeding step in the fabrication process.

FIG. 1 illustrates a form 10 to which an optical fiber 12 is affixed by cured and hardened epoxy resin 14. The form 10 is machined of solid material, such as aluminum, to develop a curved side 16 with a circular arc having a radius of curvature between 5 and 8 cm., preferably of 6 cm. Sufficient epoxy is applied to result in an adequate support surface when the part is lapped, as shown in FIG. 2. After epoxy 14 has been cured, form 10 to which fiber 12 is attached, together with a plurality of other forms and fibers which have been similarly prepared, is mounted on a lapping and polishing fixture (not shown). In this step, the loose ends of fibers 12 are secured to the fixture to prevent breakage. A flat surface 18 is lapped into the epoxy, as shown in FIG. 2. During lapping in this fashion, a small section of fiber 12 becomes exposed; and lapping of the flat surface 18 continues into fiber 12 and epoxy 14 until a predetermined amount of fiber has been removed. The depth of penetration of the fiber core is monitored by measuring the length and width of surface 18 along fiber 12. This measurement is made using a microscope and the depth of fiber removal is controlled routinely to an accuracy of ±10 micrometers, preferably within ±2 micrometers. If the radius of curvature of the fiber is less than about 4 cm., fiber 12 tends to crack as soon as the lap cuts through the buffer coating or cladding (not shown) which surrounds the fiber. Therefore, the preferred radius of curvature for fiber 12, which is determined by curved surface 16 on form 10, is 6 cm. After lapping, the flat surface is polished using the ¼ micron particle size polishing compound.

Figure 3:
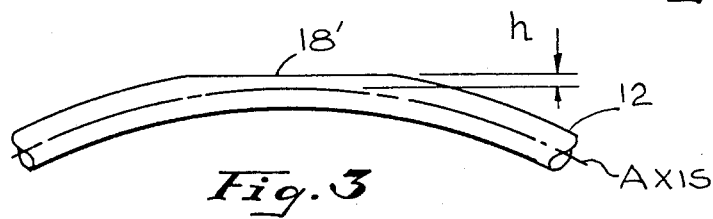
FIG. 3 is a schematic view of the fiber after treatment as in FIG. 2.

As indicated in FIG. 3, which is a schematic representation of a portion of fiber 12 lapped to provide planar surface 18', dimension h is the distance from the fiber axis to flat surface 18'. This dimension affects the performance parameters of the optical fiber tap, i.e. the tap ratio $\gamma$ as will be described hereinbelow.

Double-reflective-faced optical prism 20 of FIG. 4 is mounted on the flat surface of the fiber to couple a fraction of the light travelling in each direction in the fiber away from the fiber to respective photodiodes. The percentage of the light coupled from the fiber to the photodiode is controlled by the depth of the flat surface 18' (FIG. 3) lapped into the fiber. Only light propagating in one direction is coupled into a given photodiode; thus two prismatic surfaces, and two photodiodes are provided for in the present invention. Prism 20 is provided with mating surface 22 which eventually contacts flat surface 18' of FIG. 3. Light enters the prism through surface 22 travelling toward one of the two mirrored surfaces 24 on the prismatic sides. The surfaces are at an angle $\phi$ of 52°±5° as shown. This angle, of course, varies with the radius of curvature previously described, but for the preferred radius of curvature of 6 cm., 52° is the appropriate angle. The light is reflected inside the prism from reflective surfaces 24 and outward to the photodiodes, not shown. In its preferred form the prism used in the present invention has a width (x) of 0.57 inches, a height (y) of 0.16 inches and a thickness (z) of 0.05 inches.

Figure 4A:
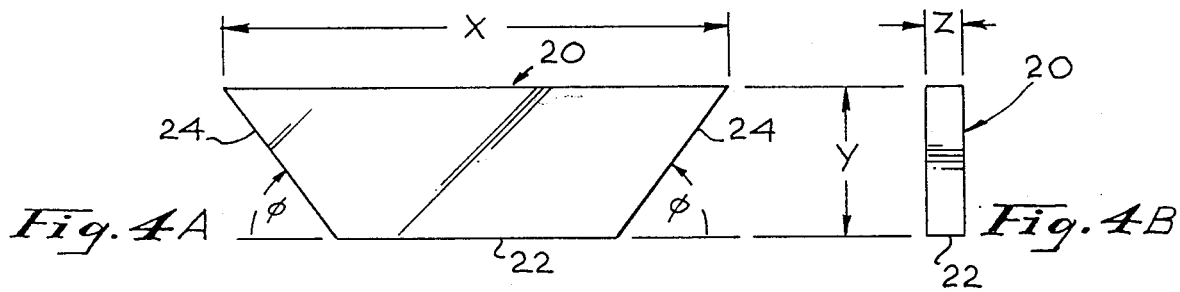
FIGS. 4A and 4B are schematic views of the second portion of one embodiment of the present invention.
Figure 4B:
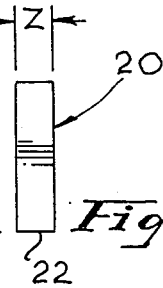

The prism to be attached to the fiber is illustrated in FIGS. 4A and 4B. The index of fraction of the glass used in the prism is important to consider. it has been determined that for best results the index of refraction of the prism, which is preferably glass, should be greater than the index of the fiber core. For example, when using a fiber with a core index of 1.61, such as the Galite 3000 LC fiber manufactured by Galileo Electro-Optics, Inc., prism glass with an index of 1.62, such as F-2 glass manufactured by Schott Glass Company, is most appropriate. The reflective surfaces are metallized, for example, by vacuum deposition of gold or aluminum, and thus act as mirrors. The light beam from the fiber strikes the reflective surface and is then reflected toward the top surface. The angles of the reflecting surfaces are chosen so that the reflected light beams are as near perpendicular to the top surface as possible. This helps reduce reflection loses at the prism-photodiode interface. The preferred angles, as noted with regard to the specific arrangements disclosed herein, are both 52°.

Figure 5:
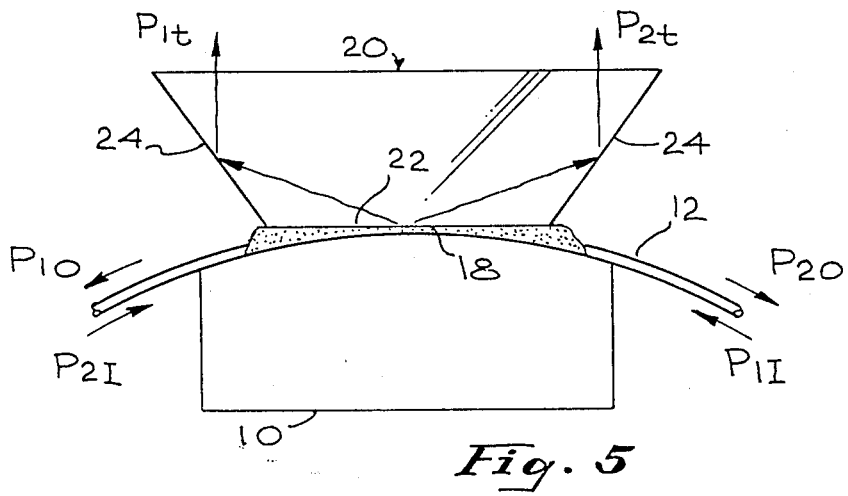
FIG. 5 is a schematic of an assembled unit.
Figure 6:
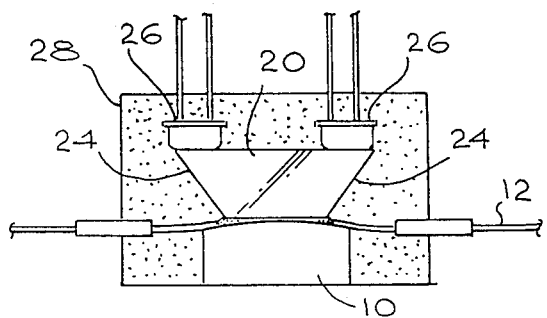
FIG. 6 is a schematic of the completed unit.

In FIG. 5, form 10 is shown with fiber 12 mounted and lapped in place to form contact surface 18. Prism 20, provided with reflective surfaces 24 and contact surface 22, is positioned over the flat lapped surface. It is then cemented in place using clear optical epoxy, for example. At this point in the process of producing the present structure, the photodiode may be cemented to the prism over the region from which the tapped beam exits the prism. The tapped beams are shown as the arrows and indicated as $P_{1t}$ and $P_{2t}$. A portion of a light signal input at $P_{1i}$ is tapped off as signal $P_{1t}$ with the remainder continuing on through as $P_{1o}$. A light signal can be applied as an input to the fiber, the photodiode placed on the prism, and the electrical response of the photodiode monitored. When the output photocurrent of the photodiode is maximized, by moving the photodiode, the photodiode has been properly positioned and is cemented in place. Two photodiodes are required in the dual directional coupler of the present invention. The second photodiode is positioned in the same manner as the first, using $P_{2i}$ and $P_{2t}$ to determine its position. After positioning and adjusting, photodiodes 26 are independently cemented in position. Finally, at this point, the coupler is encapsulated in a potting compound 28 (FIG. 6). An exemplary potting compound is Ablecast No. 402 sold under the registered trademark ABLECAST.

Figure 7:
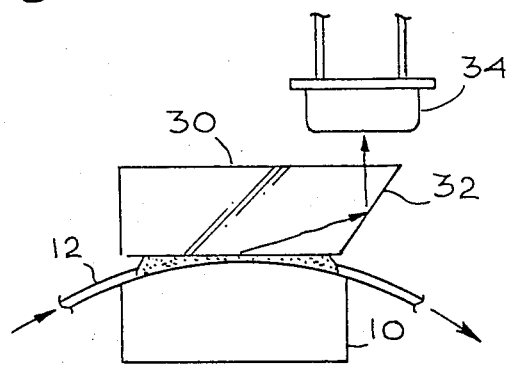
FIG. 7 is a schematic of another embodiment.

Another embodiment of the present invention is shown in FIG. 7. In this embodiment single fiber 12, attached to form 10, is prepared in the same manner as above. However, prism 30 having a single reflective surface 32 is utilized instead of prism 20 in FIG. 6. In this manner, photodiode 34 would only function as a tap coupler for light travelling from left to right, as indicated by the arrows in the figure.

Performance of the dual directional tap coupler can be characterized by three parameters; tap ratio ($\gamma$), excess loss (N) and forward to reverse signal ratio signal ($\epsilon$). Using the nomenclature described in FIG. 5, the tap ratio is defined as:

$$\gamma_x = 10 \text{ Log } [P_{xt}/P_{xi}](dB)$$

where x is 1 or 2, depending upon the selected direction of light travel, as shown in FIG. 5. Since the tap is symmetrical the forward ratio, ($\gamma_1$), should be the same as the reverse ratio, $\gamma_2$. The value of the tap ratio depends on the amount that the fiber is lapped. The more the fiber is lapped the more light is tapped off, thus increasing the tap ratio. A tap ratio of about $-25$ dB is obtained when the fiber is lapped just inside the cladding and the fiber core is not exposed. As h in FIG. 3 decreases and the fiber axis is approached, the tap ratio approaches $-3$ dB, tapping off half of the light. The excess loss can be defined as:

$$N_x = 10 \text{ Log } \left[ \frac{P_{xo} + P_{xt}}{P_{xi}} \right] (dB)$$

where x equals 1 or 2, as above. Again, because of symmetry the forward excess loss $N_1$ should be equal to the reverse excess loss $N_2$. It has been found that an excess loss in the range of $-0.5$ dB to $-1.0$ dB can easily be obtained. When a light signal is applied as input on one side of the tap coupler, most of the tap signal appears at the forward tap position. However a small fraction of the tap signal appears in the reverse tap position. This forward to reverse tap signal ratio is defined as:

$$\epsilon_x = 10 \text{ Log } [P_{xt}/P_{yt}](dB)$$

where x and y are 1 or 2, and different; and the y input is not used. Generally, a forward/reverse signal ratio in the range of $+15$ to $+20$ dB is easily obtained. The process described above produces a fiber optic tap coupler which is small, rugged and reproducible. Further, the tap ratio can be tailored to the requirements of individual fiber optic transmission lines.

Although there have been described above specific arrangements of a tap coupler circuit for fiber optics in accordance with the invention for the purpose of illustrating the manner in which the invention may be used to advantage, it will be appreciated that the invention is not limited thereto. For example, although the invention has been disclosed in the context of association with tap couplers using visible light, without multiplexing, the principles of the invention are equally applicable to multiplex systems, systems not using visible light and the like. Accordingly, any and all modifications, variations or equivalent arrangements which may occur to those skilled in the art should be considered to be within the scope of the invention as defined in the appended claims.

What is claimed is:

1. A fiber optic tap coupler device for tapping off predetermined portions of optical power from a single optical fiber comprising:
    a curved form for supporting an optical fiber and shaping a portion thereof to a predetermined segment of a circle;
    a single optical fiber mounted on said form;
    means for affixing the optical fiber along a portion thereof to the curved portion of the form of selected radius of curvature by enclosing said portion in epoxy resin applied to the form, the fiber and affixing means in the center section of the curved portion of the fiber being lapped and polished to a preselected depth of penetration into the fiber to develop an extended common planar surface along the fiber portion and the epoxy resin providing extended lateral support for mounting a prism in coupling relationship to the fiber;
    prism means affixed to said planar surface in contact with the optical fiber by means of an optically transparent adhesive, the prism means having at least one face of a predetermined characteristic angle;
    the radius of curvature of the curved portion of the form and the portion of the optical fiber affixed thereto being in the range between 5 and 8 cm, and said characteristic angle of the prism face being selected to be $52 +/- 5°$ in order to provide minimum loss with optimum coupling of optical power from the fiber;
    reflecting means formed on said at least one prism face; and
    at least one photosensitive means mounted adjacent said prism in a position to receive and monitor light tapped from said fiber, transmitted by the prism and reflected by the face.

2. The device of claim 1 wherein said fiber is capable of transmitting light in both directions along its axis and said prism contains two reflective surfaces and associated photosensitive means, one reflective surface being associated with one photosensitive means for sensing light travelling in a first direction along said fiber and the other reflective surface being associated with the other photosensitive means for sensing light travelling in the other direction along said fiber.

3. The device of claim 2 further comprising a pair of optical connectors coupled to the opposite ends of the fiber, electrical circuit connection means, means for coupling the circuit connections to the photosensitive means, and an enclosure supporting the form, the photosensitive means, and the connection means in an operative relationship.

4. The device of claim 3 wherein the photosensitive means comprises a preamplifier stage integrated with a photodiode in a single unit.

5. The device of claim 2 wherein the photosensitive means are cemented to the prism by means of an optically transparent adhesive.

6. The device of claim 2 wherein the photosensitive means are separate from the prism and mounted adjacent thereto so that light passing into the prism and reflected by one of the reflective surfaces is directed toward one of the photosensitive means.

7. The device of claim 2 wherein said radius of curvature is 6 cm.

8. The device of claim 2 wherein the material of the form is aluminum.

9. The device of claim 2 wherein the characteristic angle is 52°.

10. The device of claim 1 further comprising a pair of optical connectors coupled to opposite ends of the fiber, electrical circuit means coupled to the photodiode, and an enclosure supporting the form, the photosensitive means and the circuit means in operative relationship.

11. The device of claim 10 wherein the photosensitive means further comprises a preamplifier stage integrated with a photodiode in a single unit.

12. The device of claim 1 wherein the photosensitive means is cemented to the prism by means of an optically transparent adhesive.

13. The device of claim 1 wherein the photosensitive means is separate from the prism and mounted adjacent thereto so that light passing through the prism and reflected by the reflective surface is directed to the photosensitive means.

14. The device of claim 1 wherein said radius of curvature is 6 cm.

15. The device of claim 1 wherein the material of the form is aluminum.

16. The device of claim 1 wherein the characteristic angle is 52°.

* * * * *